(12) United States Patent
Dhua et al.

(10) Patent No.: US 9,934,526 B1
(45) Date of Patent: Apr. 3, 2018

(54) TEXT RECOGNITION FOR SEARCH RESULTS

(71) Applicant: A9.com, Inc., Palo Alto, CA (US)

(72) Inventors: Arnab Sunat Kumar Dhua, Mountain View, CA (US); Douglas Ryan Gray, Mountain View, CA (US); Xiaofan Lin, Palo Alto, CA (US); Yu Lou, Palo Alto, CA (US); Adam Wiggen Kraft, Mountain View, CA (US); Sunil Ramesh, San Jose, CA (US)

(73) Assignee: A9.com, INC., Palo Alto, CA (US)

( * ) Notice: Subject to any disclaimer, the term of this patent is extended or adjusted under 35 U.S.C. 154(b) by 927 days.

(21) Appl. No.: 13/929,689

(22) Filed: Jun. 27, 2013

(51) Int. Cl.
G06Q 30/00 (2012.01)
G06Q 30/06 (2012.01)

(52) U.S. Cl.
CPC ................ *G06Q 30/0623* (2013.01)

(58) Field of Classification Search
CPC ............... G06Q 30/06–30/0645; G06Q 30/08
USPC ................................................. 705/26.1–27.2
See application file for complete search history.

(56) References Cited

U.S. PATENT DOCUMENTS

| | | | |
|---|---|---|---|
| 5,809,183 | A | 9/1998 | Serizawa et al. |
| 6,026,177 | A | 2/2000 | Mong |
| 6,256,408 | B1 | 7/2001 | Casey |
| 8,831,329 | B1 | 9/2014 | Kumar |
| 9,098,888 | B1 | 8/2015 | Lin |
| 9,430,766 | B1 | 8/2016 | Kraft |
| 2002/0054693 | A1 | 5/2002 | Elmenhurst |
| 2004/0262378 | A1 | 12/2004 | Ooki |
| 2006/0064177 | A1* | 3/2006 | Tian ............ G10L 15/197 700/1 |
| 2006/0271847 | A1 | 11/2006 | Meunier |
| 2012/0012648 | A1 | 1/2012 | Collins |
| 2012/0030103 | A1 | 2/2012 | Hughes |
| 2012/0143760 | A1 | 6/2012 | Abulafia |
| 2012/0163718 | A1* | 6/2012 | Reddy ............ G06K 9/00456 382/176 |
| 2013/0031450 | A1* | 1/2013 | Reese ............ G06Q 30/02 715/206 |
| 2014/0009612 | A1 | 1/2014 | King |
| 2014/0169678 | A1 | 6/2014 | Chulinin |
| 2014/0193075 | A1 | 7/2014 | Pavani et al. |

(Continued)

OTHER PUBLICATIONS

Kompalli, S., Setlur, S., & Govindaraju, V. (2009). Devanagari OCR using a recognition driven segmentation framework and stochastic language models. International Journal on Document Analysis and Recognition, 12(2), 123-138. (Year: 2009).*

(Continued)

*Primary Examiner* — Michael Misiaszek
*Assistant Examiner* — Latasha D Ramphal
(74) *Attorney, Agent, or Firm* — Hogan Lovells US LLP

(57) ABSTRACT

Various embodiments enable a process to automatically attempt to select the most relevant words associated with products available for purchase from an electronic marketplace from an image frame. For example, an image frame containing text can be obtained and analyzed with an optical character recognition. The recognized words can then be preprocessed using various filtering and scoring techniques to narrow down a volume of text to a few relevant query terms. These query terms can then be sent to a search engine associated with the electronic marketplace to return relevant products to a user.

19 Claims, 11 Drawing Sheets

(56) References Cited

U.S. PATENT DOCUMENTS

2014/0195384 A1* 7/2014 Hamilton ........... G06Q 30/0601
                                                705/26.62
2014/0219561 A1   8/2014 Nakamura
2014/0355835 A1* 12/2014 Rodriguez-Serrano .. G06K 9/72
                                                382/105

OTHER PUBLICATIONS

USPTO Non-Final Office Action dated Dec. 16, 2014, U.S. Appl. No. 14/105,028, 17 pages.
"Notice of Allowance dated Apr. 1, 2015" received in U.S. Appl. No. 14/105,028.
"Non Final Office Action dated Sep. 25, 2015" received in U.S. Appl. No. 14/816,943
"Notice of Allowance dated May 19, 2016" received in U.S. Appl. No. 14/816,943.
"Non Final Office Acted dated Mar. 23, 2016" received in U.S. Appl. No. 14/565,245.
"Notice of Allowance dated May 12, 2016" received in U.S. Appl. No. 14/565,245.
"Non Final Office Acted dated Oct. 24, 2016" received in U.S. Appl. No. 15/236,153.

* cited by examiner

FIG. 2

Raw OCR Text for query (Ascs Inkjet Cartridge Remaaufactu amen Brand B LC51 C Cyan ed rep a* u)

Shop All Departments ▽ | Search | Electronics ▽ | ascs inkjet Cartridge Remaaufactu amen Your search "ascs inkjet Cartridge Remaaufactu amen Brand B Cyan ed rep a *u** did not match products.

Showing results using some of your search terms

"ascs Inkjet Cartridge Brand B" (Showing all results)

Brand 1 Laser Jet Printer
$599.91 new (1 offer)
$155.00 used (1 offer)

Brand 2 Inkjet Printer
$1,899.99
Usually ships in 6 to 10 days

Brand 3 Inkjet Printer
$1,519.69
Only 2 left in stock

FIG. 3

| Query word | Database word | Standard Levenshtein edit distance | OCR-based Levenshtein edit distance |
|---|---|---|---|
| CO50BK | CØ5ØBK | 1 | 0.3 |
| Canon | canon | 1 | 0.4 |
| Ooctor | Doctor | 1 | 0.5 |

FIG. 8B

Standard contusion matrix — 802

| | | | Destination characters | | | | | | | | | | | |
|---|---|---|---|---|---|---|---|---|---|---|---|---|---|---|
| | 0 | 1 | 2 | ... | a | b | c | ... | A | B | C | ... | # | $ |
| 0 | 0 | 1 | 1 | 1 | 1 | 1 | 1 | 1 | 1 | 1 | 1 | 1 | 1 | 1 |
| 1 | 1 | 0 | 1 | 1 | 1 | 1 | 1 | 1 | 1 | 1 | 1 | 1 | 1 | 1 |
| 2 | 1 | 1 | 0 | 1 | 1 | 1 | 1 | 1 | 1 | 1 | 1 | 1 | 1 | 1 |
| ... | 1 | 1 | 1 | 0 | 1 | 1 | 1 | 1 | 1 | 1 | 1 | 1 | 1 | 1 |
| a | 1 | 1 | 1 | 1 | 0 | 1 | 1 | 1 | 1 | 1 | 1 | 1 | 1 | 1 |
| b | 1 | 1 | 1 | 1 | 1 | 0 | 1 | 1 | 1 | 1 | 1 | 1 | 1 | 1 |
| c | 1 | 1 | 1 | 1 | 1 | 1 | 0 | 1 | 1 | 1 | 1 | 1 | 1 | 1 |
| ... | 1 | 1 | 1 | 1 | 1 | 1 | 1 | 0 | 1 | 1 | 1 | 1 | 1 | 1 |
| A | 1 | 1 | 1 | 1 | 1 | 1 | 1 | 1 | 0 | 1 | 1 | 1 | 1 | 1 |
| B | 1 | 1 | 1 | 1 | 1 | 1 | 1 | 1 | 1 | 0 | 1 | 1 | 1 | 1 |
| C | 1 | 1 | 1 | 1 | 1 | 1 | 1 | 1 | 1 | 1 | 0 | 1 | 1 | 1 |
| ... | 1 | 1 | 1 | 1 | 1 | 1 | 1 | 1 | 1 | 1 | 1 | 0 | 1 | 1 |
| # | 1 | 1 | 1 | 1 | 1 | 1 | 1 | 1 | 1 | 1 | 1 | 1 | 0 | 1 |
| $ | 1 | 1 | 1 | 1 | 1 | 1 | 1 | 1 | 1 | 1 | 1 | 1 | 1 | 0 |

Source characters

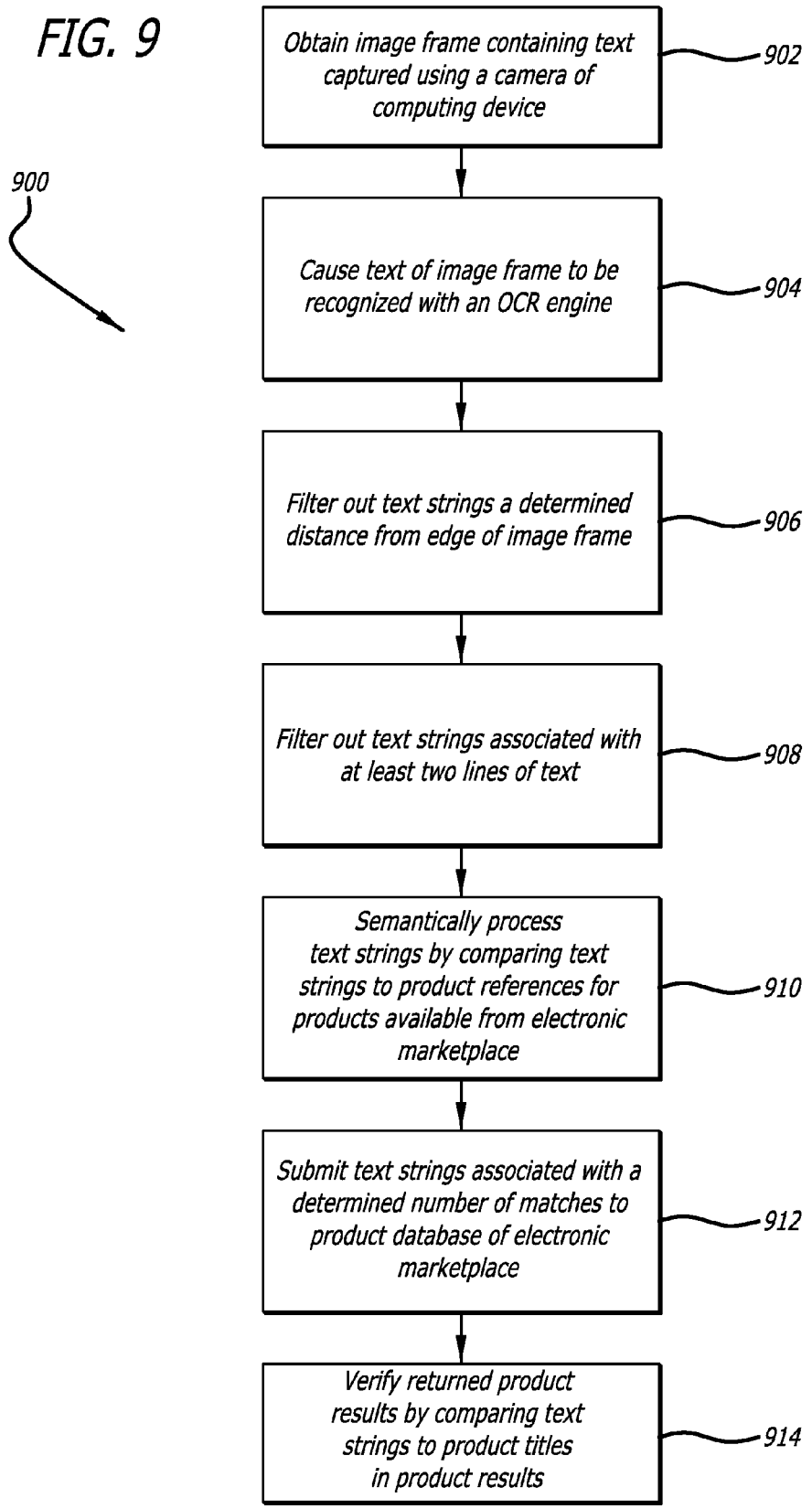

TEXT RECOGNITION FOR SEARCH RESULTS

BACKGROUND

As people are increasingly utilizing a variety of computing devices, including portable devices such as tablet computers and smart phones, it can be advantageous to adapt the ways in which people interact with these devices. Users are accustomed to manually inputting phone numbers to make a phone call, manually typing a web address into a web browser to view a web page, manually typing desired terms for a search, and the like. These tasks are often tedious and time consuming. Various methods to save users time have been offered on various devices such as assigning a phone number to a favorites list, bookmarking a Web address, creating a wish list associated with an electronic marketplace. Augmented reality (AR) and visual search applications that display a live view of a physical real-world environment augmented by computer-generated sensory input, have become more popular with adoption of smartphones and other portable computing devices. Through computer vision algorithms, some of these applications are able to provide users with information related to an environment in both a search and gaming context, thus, enabling users to interact with aspects of the environment that were previously unavailable. As technology evolves and as the features and services offered on portable computing devices evolve and expand, the ways shortcuts and other time saving methods are provided to users is changing.

BRIEF DESCRIPTION OF THE DRAWINGS

Various embodiments in accordance with the present disclosure will be described with reference to the drawings, in which:

FIG. 2 illustrates example set of search results displayed on a computing device in accordance with at least one embodiment;

FIG. 3 illustrates another example set of search results displayed on a computing device in accordance with at least one embodiment;

FIG. 7 illustrates another example input image frame captured by a computing device in accordance with at least one embodiment;

FIGS. 8A, 8B, and 8C illustrates another example input image frame captured by a computing device in accordance with at least one embodiment;

FIG. 9 illustrates an example process of analyzing text of an image frame for in order to perform a search that can be used in accordance with at least one embodiment;

DETAILED DESCRIPTION

Figure 1:
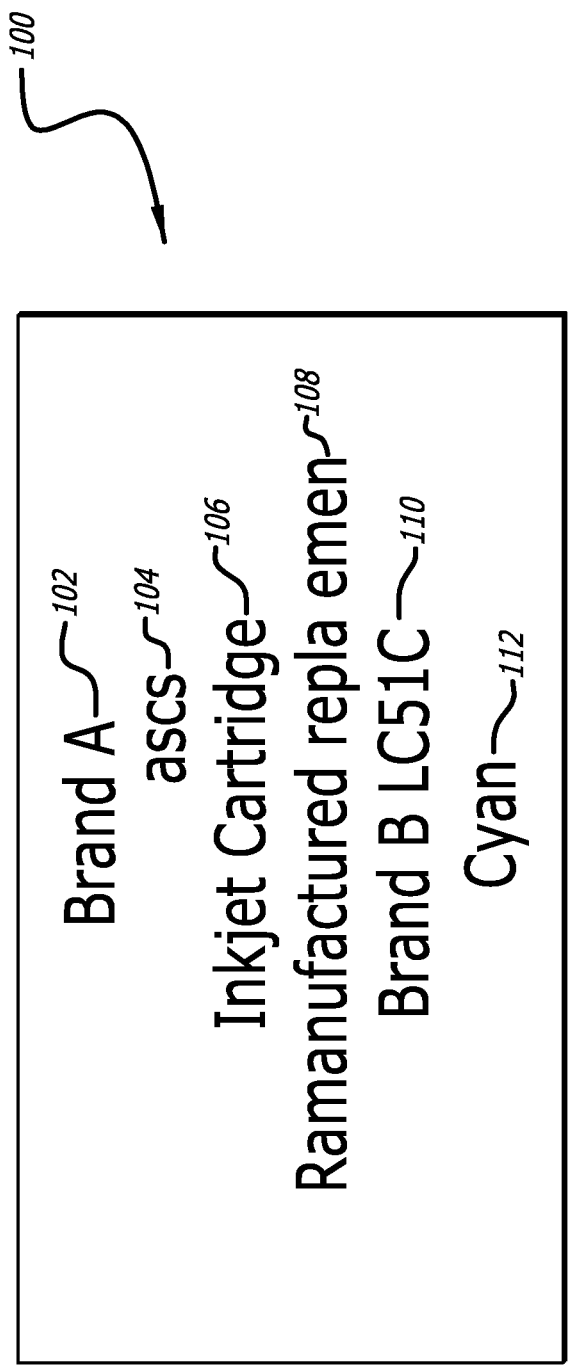
FIG. 1 illustrates an example input image frame captured by a computing device in accordance with at least one embodiment.

Systems and methods in accordance with various embodiments of the present disclosure may overcome one or more of the foregoing or other deficiencies experienced in conventional approaches to providing users with information via a computing device. In particular, various embodiments enable a device, such as a portable computing device, to perform tasks such as processing an acquired image to recognize text in the image to identify a product (or related products) associated with the text. For example, an image frame including text can be analyzed using an optical character recognition (OCR) engine and methods, in accordance with various embodiments, can automatically attempt to select the most relevant words associated with products available for purchase from an electronic marketplace. These words can then be sent to a search engine associated with the electronic marketplace to return relevant products. Such a method can include Neuro-linguistic programming (NLP)-like pre-processing steps that help filter and isolate words of the recognized text to an appropriate text query for a product search engine.

Search engines tend to work best when they receive few highly relevant search terms, as opposed to a larger volume of text. An image of a product, however, often contains a large amount of text that is irrelevant to the product, such as warning labels, instructions, and the like. Accordingly, words and phrases of text returned by the OCR engine need to be selected based on their relevance if they are going to yield adequate search results when submitted to a search engine. For example, relevant words or phrases can include brand names, model numbers, or noun phrases related to a product. These NLP steps can also correct for OCR errors and prevent text strings with errors from being sent to product search servers.

In at least one embodiment, image information, such as the position and size of the text, can be used to decide which of the recognized is likely the more important. Further, multiple image frames can be analyzed in the event that a particular portion of the text is unrecognized in one frame, such as if that particular portion is blurry or contains some other optical aberration, but readable in the next. Accordingly, with this information the system can determine a confidence value for a particular text string and send the text string as a search query when the confidence value at least meets a determined threshold confidence value. In at least some embodiments, the titles of the returned search results can also be validated.

Accordingly, in at least one embodiment, image information associated with a "live" field of view of a camera can be displayed on a portable computing device. The image information can be analyzed to attempt to recognize text in the live field of view and, in response to recognizing the text as being associated with a product available for purchase from an electronic marketplace, product listings associated with the product can be determined and displayed to a user. Upon receiving, from the user, a touch (or other) selection to a product listing, additional information for the associated product can be displayed, enabling the user to learn more about and/or purchase the product from the electronic marketplace through the portable computing device, among other such options.

Various other functions and advantages are described and suggested below as may be provided in accordance with the various embodiments.

FIG. 1 illustrates frame 100 that can be sent to a product search server for product lookup in accordance with various embodiments. In this example, frame 100 is an image of a product description for a replacement inkjet cartridge from Brand A for a Brand B printer. In this example, frame 100 is obtained post OCR or after text detection and binarization on a client computing device, such as a smartphone, tablet computer, and the like. The text detection and binarization could also be performed remotely after being sent to a server. Accordingly, there is a lot of text associated with frame 100 and not all of it was recognized in the OCR process. For example, "ascs" 104 is actually "basics," and "Remanufactured repla emen" 108 is actually "Remanufactured replacement" on the product description. Accordingly, "Brand A" 102, "Inkjet Cartridge" 106, "Brand B LC51C" 110, and Color "Cyan" 112 have been properly recognized in this example.

FIG. 2 illustrates an example results page 200 containing search results 204 returned from submitting the text strings from frame 100 without any preprocessing or error checking. In this example, column 202 shows the text strings that were submitted to a search engine to obtain search results 204. If all these words are sent to a search engine, either no results will be returned or it is more likely that incorrect results will be. In this example, the search engine tries to drop some of the search terms to formulate a shorter more coherent query but that does not produce relevant results. Accordingly, "ascs," "Inkjet Cartridge," "Remanufactured repla emen," and "Brand B LC51C" were submitted to the search engine and three inkjet printers were returned as search results 204. Search results 204 are not, however, relevant to the user that captured the original image associated with frame 100 since they were trying to recognize text associated with an inkjet cartridge replacement and, thereby, be presented with product results for the same. Accordingly, a method to isolate or identify the most relevant words for a product search from an input frame, such as frame 100, is therefore desirable. In order to achieve this end, information from both the input image frame, such as the size, position of text, etc.) is used, as well as semantic knowledge of the recognized words. Further, another goal is to avoid false positives when a user is pointing their computing device at products or at other printed text that includes text associated with phone numbers, the interior content of books or magazines, and the like.

Given a frame of text, such as frame 100 from FIG. 1 and its respective search results from FIG. 2, a number or heuristic test that can be applied to the recognized text in an attempt to isolate or identify the most relevant words in the same to send to a product search server. Some of these steps are filtering steps that filter out words that are determined to be irrelevant. Some other steps are scoring steps that re-order the priorities of different words. Additionally, some of these steps involve OCR-based spelling correction. Finally some steps infer semantic information from the collection of words and decide what words would be relevant for product search.

Words Close to Image Boundary

Figure 5A:
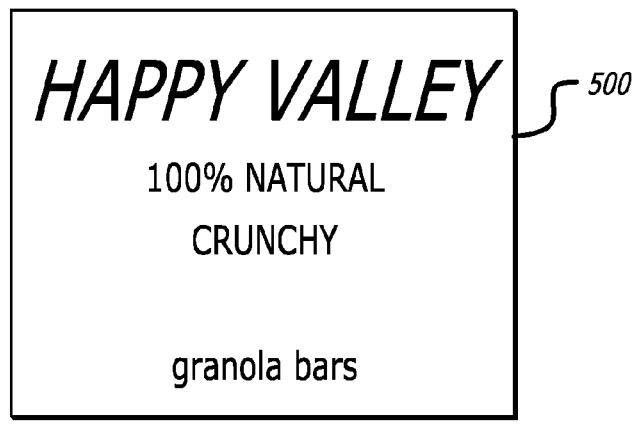
FIGS. 5A and 5B illustrates another example input image frame captured by a computing device in accordance with at least one embodiment.
Figure 5B:
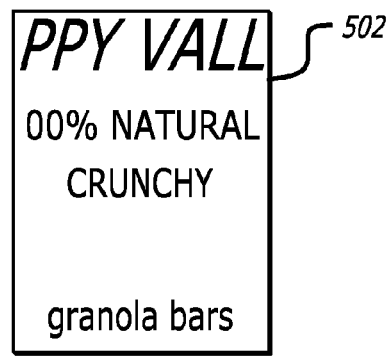

FIG. 5A illustrates an example product 500 for "Happy Valley" granola bars that a user may be interested in either learning more about or is interested in purchasing more of from the electronic marketplace through their computing device. In this example, however, the user was unable to fit all of the text in the image fame and the text of product 500 was, thereby, partially cropped to produce cropped frame 502, as shown in FIG. 5B. In this example, the text strings "URE" and "VALL" of cropped frame 502 are close to the frame boundaries which are cropped from "NATURE" and "VALLEY". In at least one embodiment, words that are close to the image boundaries or within a determined distance of an edge of the image or frame can be ignored. Words or text strings in a given frame, however, can be of different heights and, in order to make this rule more accurate, the distance that a text string is from an edge of the image can be expressed as a percentage of the height of the text string and a threshold can be applied to this percentage. In this example, since the text strings "NATURE" and "VALLEY" are so close to the edge of the cropped frame 502 that a portion of their text has been cropped out of the image, the cropped text strings "URE" and "VALL" will be omitted in this example.

Word and Line Count Filters

Since large volumes of text tend to be either product descriptions or material from, for example, the inside a book or magazine, such text is usually often irrelevant or misleading for the purposes of product searching. Accordingly, a word and line count filter can be applied when a first number of text lines (e.g., >2) are identified. In this example, an associated confidence score of each word of text string could be adjusted downward. In one example, when a second greater number of lines of text (e.g., >5) is identified, all words or text strings associated with these lines can be ignored. All the remaining text strings, either singular or from smaller text lines, are retained for further processing.

Figure 6:
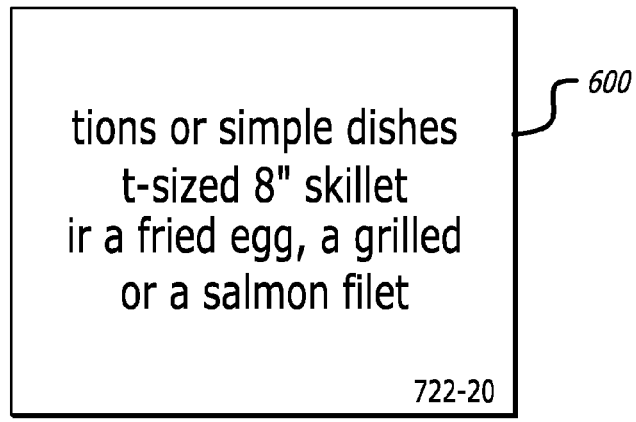
FIG. 6 illustrates another example input image frame captured by a computing device in accordance with at least one embodiment.

For example, FIG. 6 shows frame 600 that includes part of a product description for a skillet. In this example, the product description includes words that are relevant to a skillet, but also includes words, such as salmon and dishes, and fried egg, that could be misleading. Accordingly, since fame 600 includes four lines of text, a respective confidence score for each word or text string in these lines could be reduced or the entire block of text could be ignored. In this example, however, there is also a product number by itself, away from the description. Accordingly, the model number will be isolated or pass this filtering step.

Stop Word Based Prioritization

In at least one embodiment, text strings that passed the previous steps can now be scored. For example, if a line of text contains a stop word, such as an, the, and, has, but etc., each text string in such a text line could be scored lower or their respective confidence score could be adjusted downward. Thus, the notion of stop words in this context may be considered similar to stop words used for text search. Additionally, classes of common words that are not relevant for product search can also be added to a stop word list for purposes of this step. For example, words such as road, street, way, and the like, which are usually present in addresses, but are not typically relevant to products could be added to such a list. Further, words such as days of the week and months of the year could also be since they too are not typically relevant to product search. The intuition behind this step is that a line of text that contains a stop word is probably a line of descriptive text, which will likely contain relevant words; however, these same words could be misleading for also being suggestive of other products. Further, such descriptive text will inevitably contain irrelevant text as well. In at least one embodiment, this rule is used to change the priority of words in a relative ranking among each other and may not remove words from the list of words being analyzed. FIG. 6 is also relevant to stop word based prioritization. For example, the product description in frame 600 includes a number of stop words, such as "a" and "or." Accordingly, the relative ranking of all the text strings in frame 600 would go down relative to the model number.

OCR Score Based Word Prioritization

As part of the OCR process, each word recognized word is given a score by the OCR engine. This OCR score is proportional to the confidence that the OCR engine has that a particular word was correctly recognized. In at least one embodiment, the remaining words at this stage can be further reordered according to this confidence score. Accordingly, the word or text string with the highest score will keep its current score and the score of all other words can be reduced by a factor proportional to the difference between a particular word's score and the highest score.

Text Height Based Word Prioritization

Figures 7, 8A:

In at least one embodiment, the word or text string priorities are further reordered as a function of text height or font size. For example, the larger the text or font size is in a frame, the assumption is that it is more important relative to smaller text. FIG. 7 illustrates an example image frame that was captured of a box of mint tea from Brand X. For example, the words Mint Tea and Brand X at the top of the frame would receive either a score adjustment or the priority ranking of each of the words could be readjusted where the larger text is given a ranking boost upward.

Distance from Image Center Based Word Prioritization

In at least one embodiment, the text strings ranking or score can also be adjusted using a distance from image center based word prioritization. For example, when users scan a particular word or item, they tend to try to center the word or item in the view finder of the image capture application. Accordingly, words or text strings can be reprioritized based on their distance from the center of the image frame. That is, the word closest to the center may keep its current score and all other words are rescored based on their distance from the center. For example, the farther away from the center a word is located, the more its score is reduced.

Semantic Processing

In at least one embodiment, words, text strings, or phrases can classified into semantically relevant categories for product search, such as brand names, model numbers, and noun phrases related to products. First, a list of noun phrases of items sold by, for example, an electronic marketplace is created. Examples of noun phrases can include laptop, wireless router, inkjet cartridge, and the like. Similarly, a list of Brand names and Model numbers (e.g., CRC-400, LC51C etc.) that are part of a product catalog associated with the electronic marketplace are also created.

Since data from the electronic marketplace is not always clean, a cleanup process can be applied while creating these lists. For example, if the noun list is created first, the noun list can be scrubbed against the stop words list. Accordingly, when creating the brands list, words that are already listed as stop words or noun phrases can be removed from the brands list. Similarly all words that were classified as noun phrases or brands are excluded from the list of model numbers.

The words obtained from the query image frame that remain after the previous step (word distance from image center) can then matched against these lists of noun phrases, brands and model numbers. The words that match any of these lists can then be classified as nouns, brands and model numbers respectively. In order to perform this comparison, the words obtained from the query image are grouped into phrases of different lengths to compare against the list of noun phrases, brands and model numbers. In at least one embodiment, longer phrase matches are preferred to shorter phrase or word matches. For example, the single phrase "wireless router" is a better match than the two words "wireless" and "router" separately.

OCR Based Word Correction

The OCR engines are not perfect and are known to make certain kinds of recognition errors. For example, it is common for an OCR engine to mix up 0's (zeros) and O's (the letter O) or 1's and l's. Other less common errors include confusing the letters Z and 2 or D and O. Accordingly, approximate matches are accepted while matching the list of remaining words against the noun phrase, brand, and model number lists. The words are then compared against the approximate matches and the matches are scored based on a Levenshtein distance that has been generalized to take OCR errors into account. The matches that are within a certain value of this generalized edit distance are considered matches and the word from the list is taken as the corrected version. In one example, the edit distance threshold used can also depend on the length of the word being matched.

FIG. 8A shows table 800 which illustrates a few examples utilizing the edit distance. In this example, there is a column for the database word, a column for the query word that was captured by the user, a column for the standard edit distance, and a column for the OCR-based edit distance. In each of these examples, a single character of the query word is off. In this example, the generalized OCR distance can be specified taking standard confusion matrix 802, shown in FIG. 8B, between all characters and reducing the edit distance between certain pairs of characters (e.g., between 0 and O's). The standard confusion matrix 802 for edit distance has a value of 1 when the source character and destination character are different and a value of 0 when the source character and destination character are the same.

Figure 8C:

The standard confusion matrix 802 can be modified for certain source and destination characters as shown in OCE-Error Confusion Matrix 804 shown in FIG. 8C. In this example, the first two rows are just copied from the standard confusion matrix 802 for illustration purposes. The remaining rows are examples of how the edit distance can be modified for similar looking characters.

Final Query Formulation

In at least one embodiment, a query is issued to the product database when a noun phrase and a brand name are found or if an alpha-numeric model number has been found. Further, while composing the query for product search, up to two noun phrases, two model numbers and a brand could be used. The selection of the top ranking words is based on the scoring explained above. In at least one embodiment, if the system decides not to submit a query, then the nouns, brands and model numbers can be sent back to the computing device and the user can select among those words to formulate a custom query.

Figure 3:
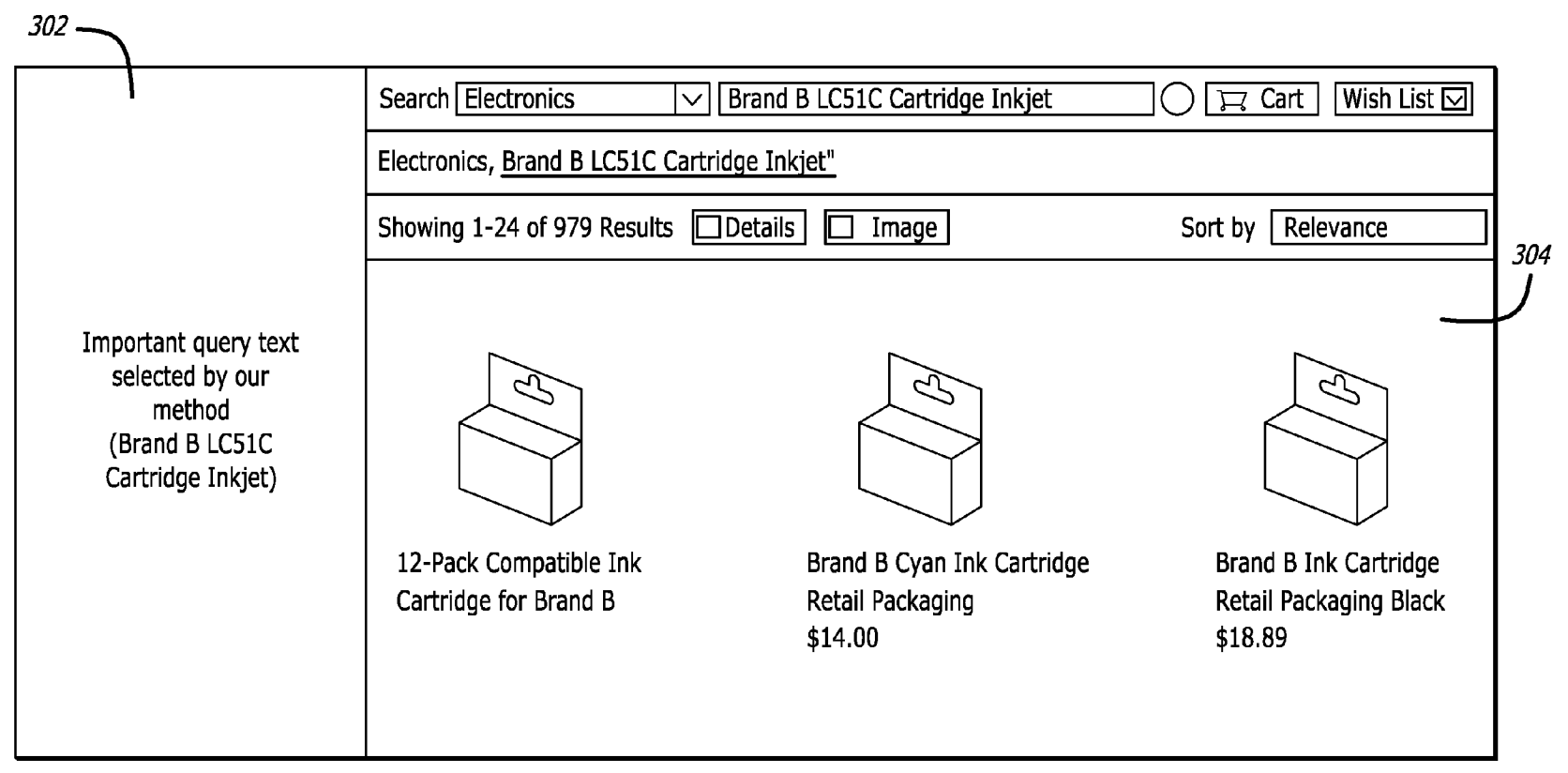

Accordingly, FIG. 3 illustrates an example results page 300 containing search results 304 returned from submitting the text strings from frame 100 after they have been filtered and scored using the steps described above. Accordingly, in this example, the query results all include inkjet cartridge replacements which are much more relevant to the user's desire to learn more about and be presented with the same, as opposed to search results 204 from FIG. 2. In this example, column 302 lists the query terms that were used to return these results are much more relevant to inkjet cartridge replacements and focused on the same compared to those query terms used in column 202 of FIG. 2. In at least one embodiment, these search results obtained from the above step can then be validated against the query. In at least one embodiment, the number of search query terms included in the product title of a particular returned search result can be counted. A result is considered valid if a certain number or percentage of the query terms are present in the product title of the search result.

Figure 4:
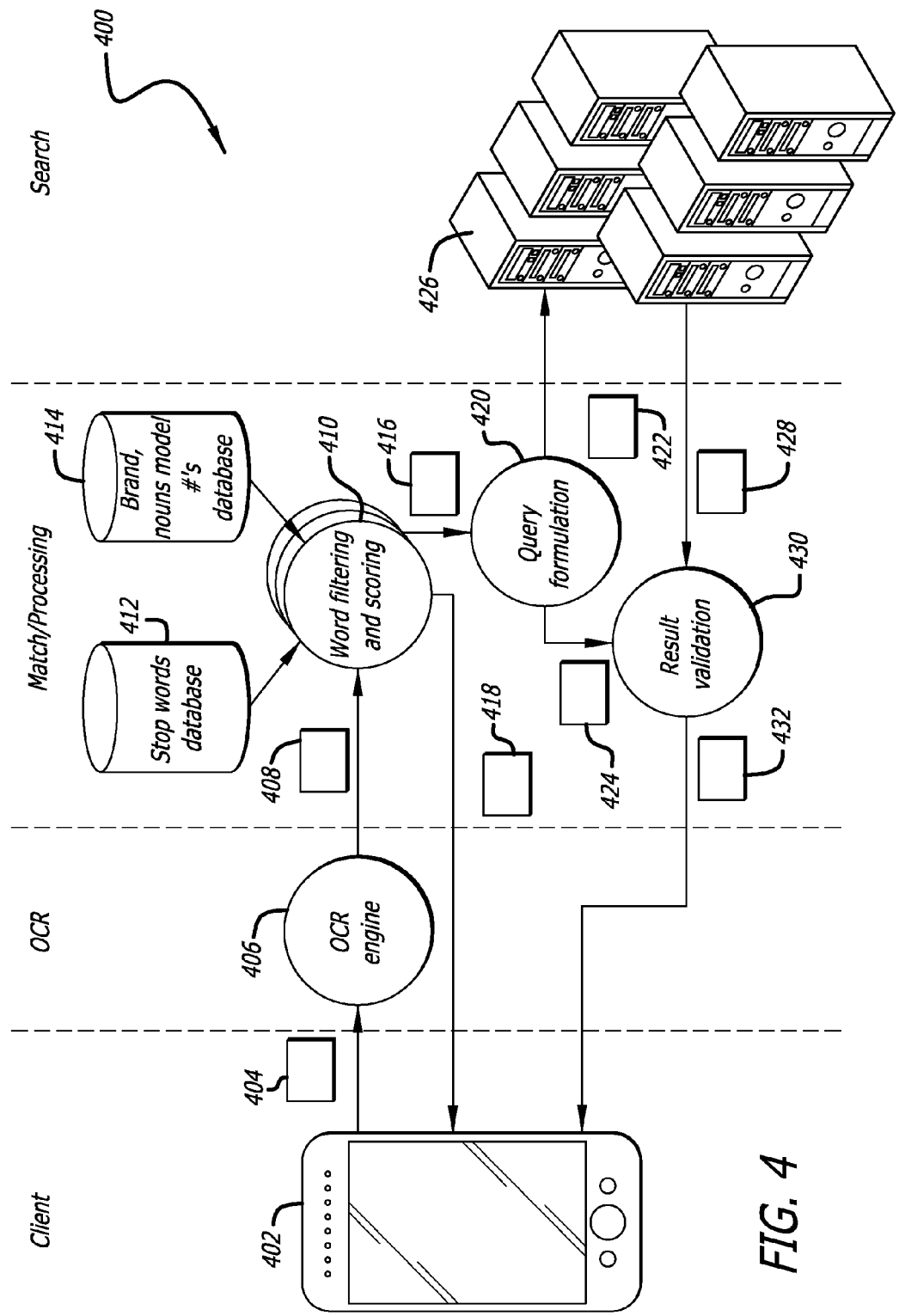
FIG. 4 illustrates an example data flow through a system in accordance with at least one embodiment.

FIG. 4 illustrates an example data flow 400 though the query text selection and product search system, in accordance with various embodiments. In this example, a binary mask of input image 404 containing text is sent from computing device 402 to OCR engine 406. From OCR engine 406, candidate text strings and their respective location 408 within the input image 404 are sent to word filtering and scoring module 410. In this example, word filtering and scoring module 410 utilizes data stored in stop words database 412 and brand names, nouns, and model number database 414. From word filtering and scoring module 410, selected brands, nouns, and model numbers 416 are sent to query formulation module 420 which formulates search query 422 and sends the same to search database 426 and also sends copy search query 424 to results validation module. At this point, search database 426 sends search results 428 to be compared to copy search query 424 to validate the same. After search results 428 are validated, validated search results 432 are sent for presentation to a user on computing device 402. Further, before query formulation, brands, nouns, and model numbers 418 can also be sent to computing device 402.

FIG. 9 illustrates an example process 900 for analyzing an image frame that includes text to identify the most relevant words for a product search that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, an image frame containing text captured using a camera of computing device is obtained 902. In this example, text of image frame is recognized with an OCR engine 904. In this example, text strings a determined distance from edge of image frame can be removed from query term consideration 906. Further, text strings associated with at least two lines of text can also be removed from consideration 908. In this example, the text strings can then be semantically processed by comparing each text string to product references for products available from electronic marketplace 910 and text strings associated with a determined number of matches can be submitted to a product database of electronic marketplace 912. Accordingly, the product database will return product results associated with the text strings and these product results can be verified by comparing titles of each product to the text strings 914. The number of text strings that are also present in the title of the returned product can be counted and result can be considered valid if a certain percentage of the query terms are present in the title of a respective search result. Various other types filters and scoring methods can be utilized and provided as well within the scope of the various embodiments.

In at least one embodiment, an image frame containing text captured using a camera of a computing device is obtained. The text within the image frame is subsequently recognized with an OCR engine where an output of the OCR engine includes recognized text strings and a score for each text string associated with a respective recognition confidence. Text strings from the output of the OCR engine that are at least one of a determined distance from an edge of the image frame or are associated with a determined number lines of text are removed or filtered out to generate a set of text strings to generate a set of filtered text strings. In this example, the determined distance from an edge of the image frame is a function of height of a respective text string. This set of filtered text strings is rank or prioritized according to the score for each text string and then compared to product references associated with products available for purchase from an electronic marketplace. A combined threshold number of matches or approximate matches to within an allowable deviation are identified between the ranked set of filtered text strings and product references and the ranked set of filtered text strings are submitted to a search engine associated with the electronic marketplace.

In one example, each of the set of filtered text strings is compared to a list of stop words that includes words unassociated with products available for purchase from the electronic marketplace. The score of each text string in a line of text strings is then adjusted downward when at least one of the text strings in the line is a stop word. The score of each text string can also be adjusted as a function of text size relative to other text strings where the score is adjusted upward for larger font sizes relative to smaller font sizes. Further, the score can be adjusted as a function of distance from a center of the image frame.

Figures 10A, 10B:
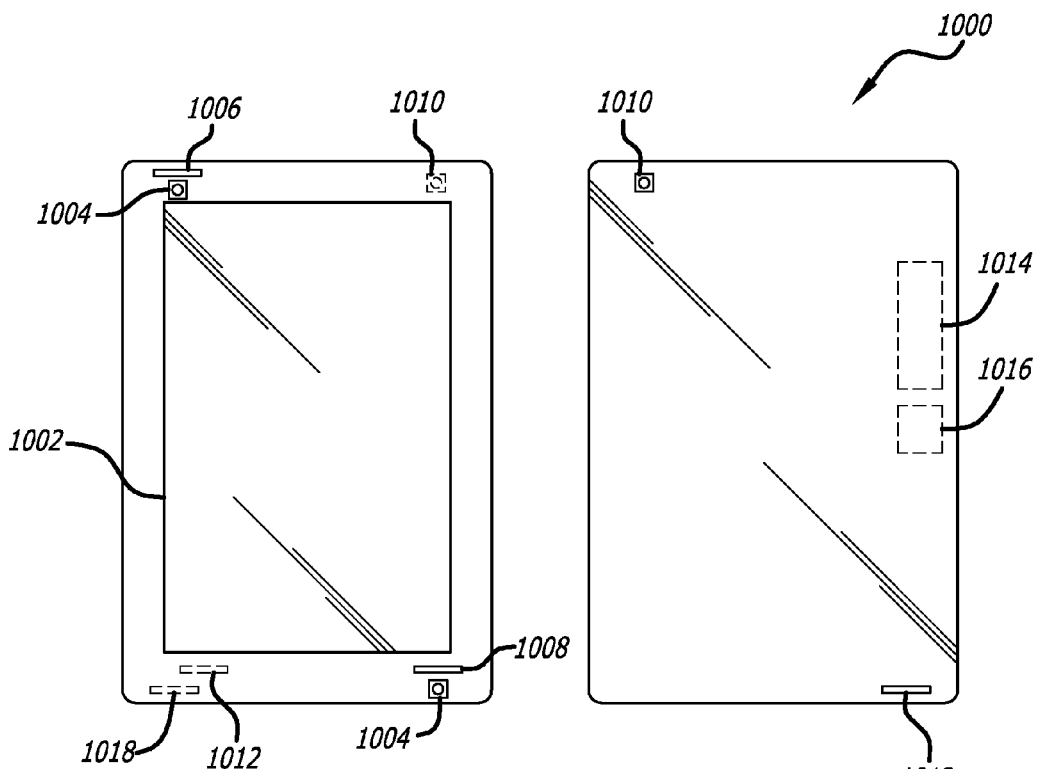
FIGS. 10A and 10B illustrate an example computing device that can be used to implement aspects of various embodiments.

FIGS. 10A and 10B illustrate front and back views, respectively, of an example electronic computing device 1000 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1000 has a display screen 1002 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1004 on the front of the device and at least one image capture element 1010 on the back of the device. It should be understood, however, that image capture elements could also, or alternatively, be placed on the sides or corners of the device, and that there can be any appropriate number of capture elements of similar or different types. Each image capture element 1004 and 1010 may be, for example, a camera, a charge-coupled device (CCD), a motion detection sensor or an infrared sensor, or other image capturing technology.

As discussed, the device can use the images (e.g., still or video) captured from the imaging elements 1004 and 1010 to generate a three-dimensional simulation of the surrounding environment (e.g., a virtual reality of the surrounding environment for display on the display element of the device). Further, the device can utilize outputs from at least one of the image capture elements 1004 and 1010 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1008 on the front side, one microphone 1012 on the back, and one microphone 1006 on or near a top or side of the device. In some devices there may be only one microphone, while in other devices there might be at least one microphone on each side and/or corner of the device, or in other appropriate locations.

The device 1000 in this example also includes one or more orientation- or position-determining elements 1018 operable to provide information such as a position, direction, motion, or orientation of the device. These elements can include, for example, accelerometers, inertial sensors, electronic gyroscopes, and electronic compasses.

The example device also includes at least one communication mechanism 1014, such as may include at least one wired or wireless component operable to communicate with one or more electronic devices. The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

Figure 11:
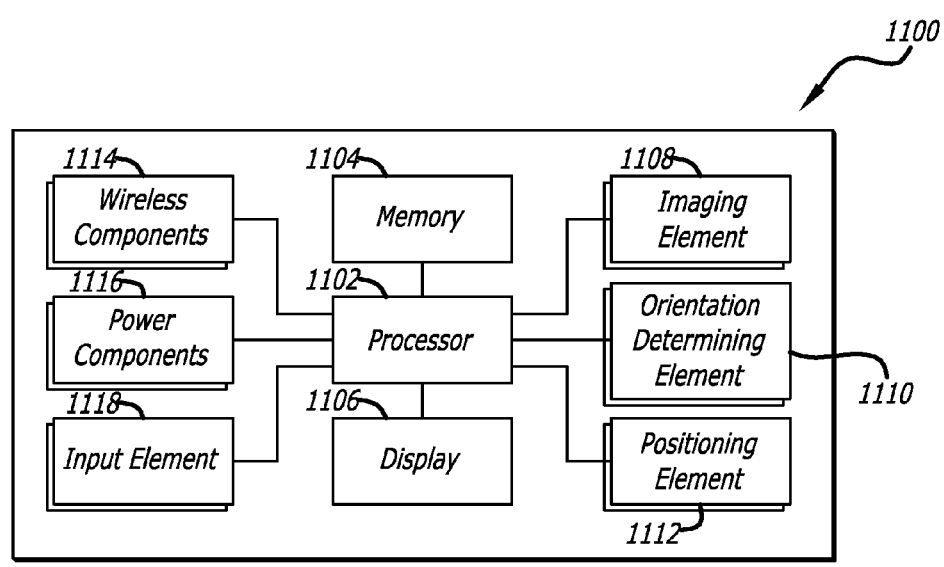
FIG. 11 illustrates example components that can be used with a device such as that illustrated in FIGS. 10A and 10B.

FIG. 11 illustrates a set of basic components of an electronic computing device 1100 such as the device 1000 described with respect to FIG. 10. In this example, the device includes at least one processing unit 1102 for executing instructions that can be stored in a memory device or element 1104. As would be apparent to one of ordinary skill in the art, the device can include many types of memory, data storage, or computer-readable media, such as a first data storage for program instructions for execution by the processing unit(s) 1102, the same or separate storage can be used for images or data, a removable memory can be available for sharing information with other devices, and any number of communication approaches can be available for sharing with other devices.

The device typically will include some type of display element 1106, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1108, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1100 also includes at least one orientation determining element 1110 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1100. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1112 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1114 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1116, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1118 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 12:
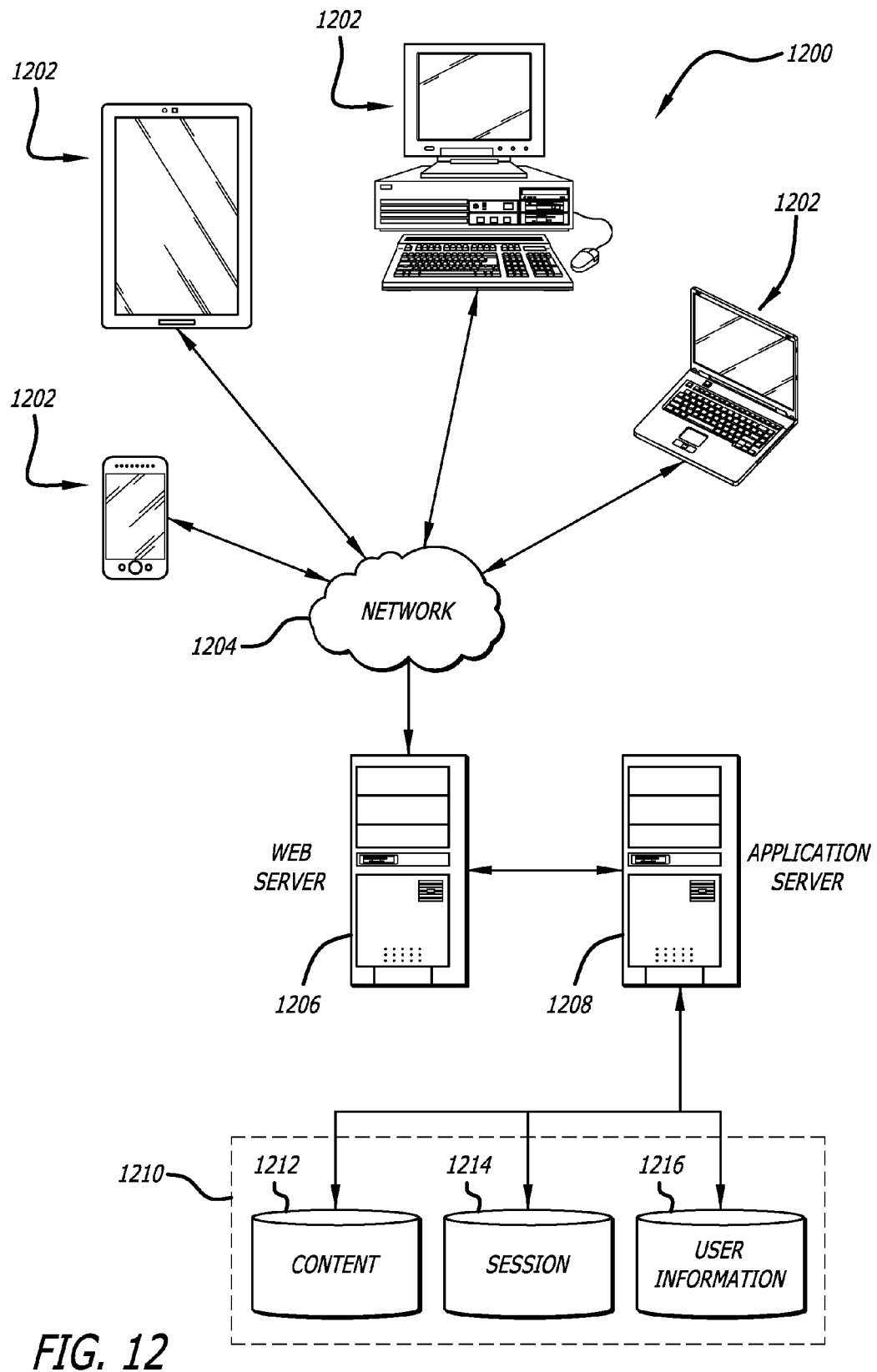
FIG. 12 illustrates an environment in which various embodiments can be implemented.

As discussed, different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks, an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1206 in the form of HTML, XML or another appropriate structured language in this example. The handling of all requests and responses, as well as the delivery of content between the client device 1202 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side. The data store is also shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium storing instructions that, when executed by at least one processor, cause a computing device to:

obtain at least one image frame containing text captured using a camera of the computing device;

cause the text within the at least one image frame to be recognized with an optical character recognition (OCR) engine, an output of the OCR engine including recognized text strings and a score for each text string associated with a respective recognition confidence;

filter the recognized text strings from the output of the OCR engine that are at least one of a determined distance from an edge of the at least one image frame or are associated with at least two lines of the text to generate a set of text strings to generate a set of filtered text strings;

adjust the score of each text string as a function of distance from a center of the at least one image frame, the score associated with a text string near the center being adjusted upward relative to a text string closer to an edge of the at least one image frame;

rank the set of filtered text strings according to the score for each text string;

compare each text string of the set of filtered text strings to content references associated with content items;

identify a combined threshold indicating a number of matches or approximate matches to within an allowable deviation between the ranked set of filtered text strings and the content references, the content references including text strings corresponding to identifying features of the content;

submit the ranked set of filtered text strings associated with the identified number of matches or the approximate matches within the allowable deviation to a search engine to return content search results for the ranked set of filtered text strings;

compare the ranked set of filtered text strings to title text strings of the content search results; and provide a respective content search result for display on the computing device when a number of text strings from the ranked set of filtered text strings appearing in a title text string of the respective content is at least equal to or exceeds the combined threshold.

2. The non-transitory computer-readable storage medium of claim 1, wherein the determined distance from an edge of the at least one image frame is a function of height of a respective text string.

3. The non-transitory computer-readable storage medium of claim 1, wherein the instructions that, when executed by the at least one processor, further cause the computing device to:
compare each of the set of filtered text strings to a list of stop words, the list of stop words including words unassociated with content; and
adjust the score of each text string in a line of text strings downward when at least one of the text strings in the line is a stop word.

4. The non-transitory computer-readable storage medium of claim 1, wherein the instructions that, when executed by the at least one processor, further cause the computing device to:
adjust the score of each text string as a function of text size relative to other text strings of the set of filtered text strings, the score being adjusted upward for larger font sizes relative to smaller font sizes.

5. The non-transitory computer-readable storage medium of claim 1, wherein identifying the approximate matches within the allowable deviation includes:
determining a match score for each of the approximate matches relative to a respective matching content reference based on a Levenshtein distance; and
based at least in part on a match score for a respective approximate match being above a matching threshold, determining that the respective approximate match matches a respective content reference.

6. A computer-implemented method, comprising:
receiving an output from a character recognition engine;
removing text strings from the output associated with descriptive text to generate a set of candidate text strings, the descriptive text including text strings associated with two or more lines of text from the output;
comparing the set of candidate text strings to content references associated with content, the content references including text strings corresponding to identifying features of the content;
determining a score for each candidate text string of the set of candidate text strings, the score for each candidate text string determined as a function of distance from a center of at least one image frame processed by the character recognition engine, the score associated with a candidate text string near the center being adjusted upward relative to a text string closer to an edge of the at least one image frame;
identifying a number of semantically relevant candidate text strings of the set at least approximately matching at least one content reference text string to within an allowable deviation, the identified number of semantically relevant candidate text strings at least equaling or exceeding a combined threshold indicating a number of matches or approximate matches to within the allowable deviation; and
submitting the identified number of semantically relevant candidate text strings for content search to at least one content database.

7. The computer-implemented method of claim 6, further comprising:
scoring each text string of the set of candidate text strings based at least in part on at least one of font size or the distance from a center of an image frame associated with the output from the recognition engine.

8. The computer-implemented method of claim 7, wherein the identified number of semantically relevant candidate text strings correspond to highest scoring text strings of the set of candidate text string at least approximately matching the at least one content reference to within the allowable deviation.

9. The computer-implemented method of claim 6, wherein the at least one content reference is determined by generating a list of at least one of noun phrases, brand names, or content numbers associated with the content.

10. The computer-implemented method of claim 7, further comprising:
comparing each of the set of candidate text strings to a list of stop words, the list of stop words including words unassociated with the content; and
lowering scores of text strings in a line of text strings containing a stop word from the list of stop words.

11. The computer-implemented method of claim 9, further comprising:
classifying each text string of the set of candidate text strings at least approximately matching at least one content reference to within the allowable deviation as one of a noun, a brand name, or a model number.

12. The computer-implemented method of claim 11, wherein identified candidate text strings are submitted when a determined number of at least one of nouns, brand names, or model numbers are identified.

13. The computer-implemented method of claim 6, further comprising:
determining a match score for each of the approximately matching text strings relative to a respective content reference based on a customized Levenshtein distance; and
based at least in part on a match score for a respective approximate match being above a matching threshold, determining that the respective approximate match matches a respective content reference.

14. The computer-implemented method of claim 13, wherein the customized Levenshtein distance uses a modified confusion matrix of text characters, the modified confusion matrix being determined by reducing an edit distance between at least one text character of a standard confusion matrix of text characters.

15. The computer-implemented method of claim 6, further comprising:
obtaining, from the at least one content database, content search results for the content;
comparing the identified number of candidate text strings to the content search results; and
providing a respective content search result for display on a computing device when a threshold number of the identified number of candidate text strings appear in a title of the respective content.

16. A computing device, comprising:
a processor;
an imagining element;
a display element; and
memory including instructions that, when executed by the processor, cause the computing device to:
capture, using the imagining element, an image of text;
cause the text within the image to be recognized with a character recognition engine;

receive, from the character recognition engine, a score for each text string associated with the text, each score corresponding to a level of recognition confidence for a respective text string;

adjust the score for each text string based on a function of distance from a center of the image, the score associated with a text string near the center being adjusted upward relative to a text string closer to an edge of the image;

filter out at least a portion of the text that is at least one of a determined distance from an edge of the image or are associated with a determined volume of text;

compare the text to content references associated with content, the content references including text strings corresponding to corresponding to identifying features of the content;

identify a determined number of text strings matching content reference text strings at least equaling or exceeding a combined threshold, the combined threshold indicating a number of matches or approximate matches to within an allowable deviation; and submit the determined number of text strings to at least one content database.

17. The computing device of claim 16, wherein the instructions that, when executed by the processor, further cause the computing device to:

adjust the score for each text string in a line of text associated with at least two lines of text downward.

18. The computing device of claim 16, wherein the instructions that, when executed by the processor, further cause the computing device to:

adjust the score for each text string of the text based at least in part on font size.

19. The computing device of claim 18, wherein the instructions that, when executed by the processor, further cause the computing device to:

compare each text string to a list of stop words including words unassociated with the content; and lowering scores of text strings in a line of text strings containing a stop word from the list of stop words.

* * * * *